Nov. 1, 1938.  G. W. CRISE ET AL  2,134,685
METHOD OF OPERATING SHADED POLE MOTORS
Filed Jan. 19, 1933
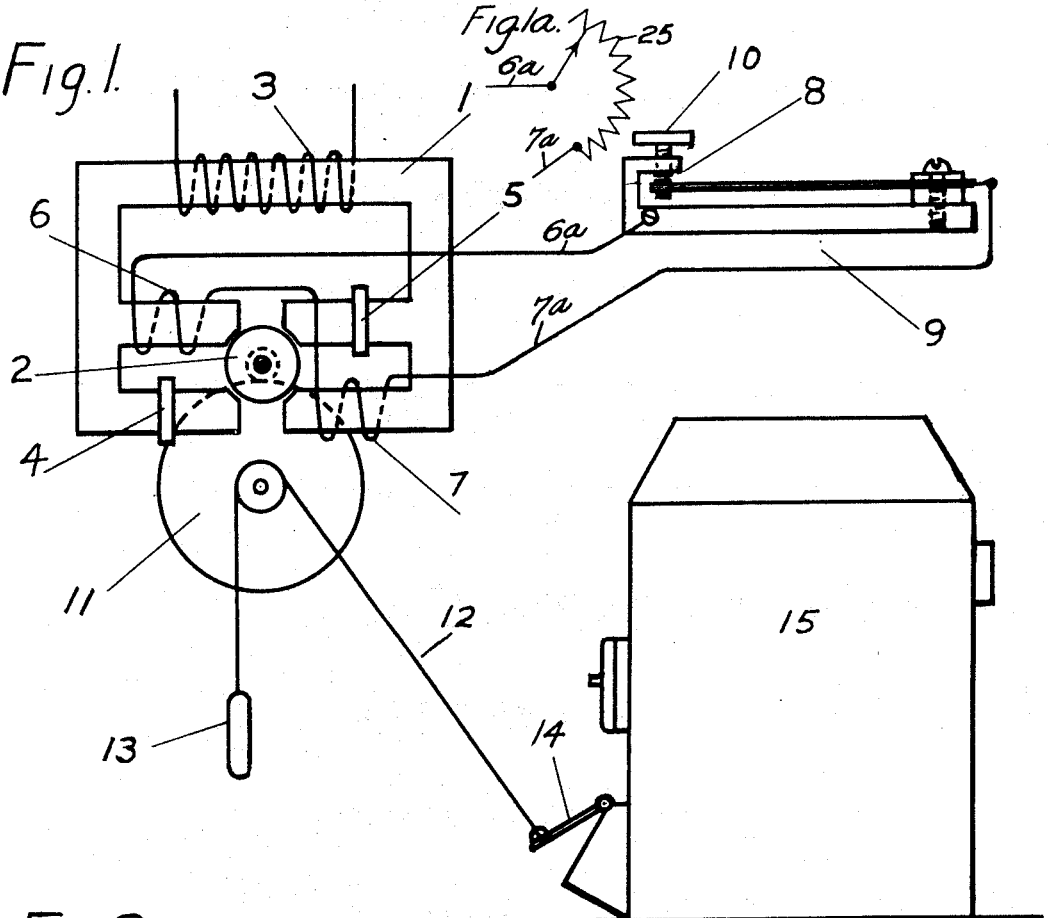
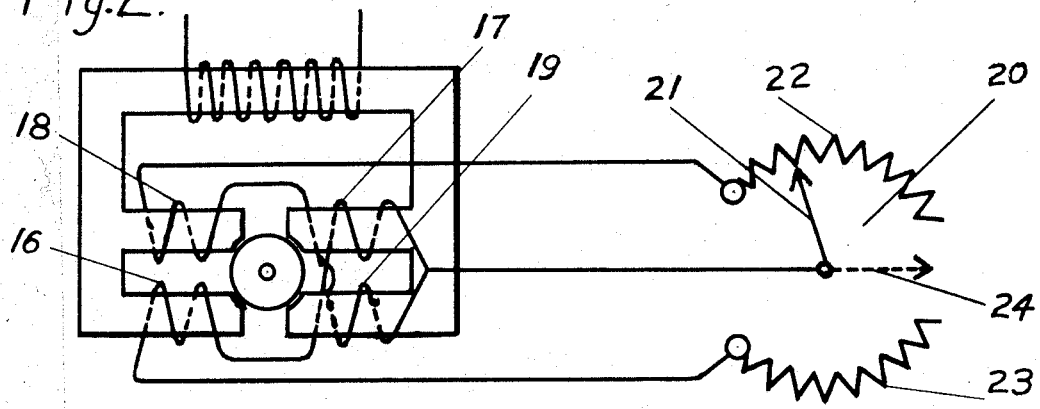
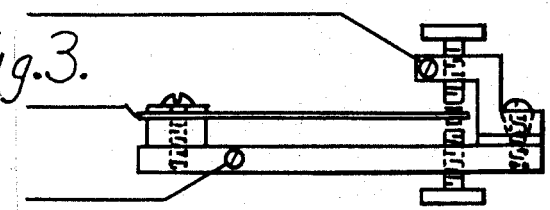
INVENTORS
George W. Crise
Wilford P. Crise Patented Nov. 1, 1938

2,134,685

UNITED STATES PATENT OFFICE 2,134,685

METHOD OF OPERATING SHADED POLE MOTORS

George W. Crise and Wilford P. Crise, Mount Vernon, Ohio, assignors, by direct and mesne assignments, to Crise Electric Manufacturing Company, Mount Vernon, Ohio, a corporation of Ohio Application January 19, 1933, Serial No. 652,528

2 Claims. (Cl. 172—278)

The principal object of our invention is to provide an improved reversible shaded pole type induction motor. An additional and important object of our invention is to provide a reversible motor for control apparatus which can be reversed by closing a single circuit in which such small current flows that a thermostat or other delicate controlling means will function without a relay.

Heretofore it has been necessary to provide for the reversal of an electric motor, either a double pole double throw, or a single pole double throw switch, which switch was required to carry the full current of the motor.

Another object of our invention is to provide a novel method of controlling the rotation of a shaded pole motor.

Another object of our invention is to provide an improved "variable screen shaded pole motor" which can be reversed by closing a single contact and the current which flows in this control circuit is so small that a delicate single contact thermostat will control the direction of rotation of our motor without the intervention of a relay or other amplifying mechanism. In connecting this thermostatically controlled motor through a train of reduction gears to the gas valve or dampers of a furnace, we have a system of temperature regulation, which is extremely sensitive, and at the same time simple and inexpensive.

A further object of our invention is to provide a motor of the present type of increased efficiency which is inexpensive to manufacture and dependable due to the absence of any delicate parts.

In addition to this, the advantages of the wound screen with a rheostat in circuit for speed regulation together with the other objects and advantages of our invention will become more apparent during the study of the following description, taken in connection with the accompanying drawings wherein:

Figure 1 is a plan view of a form of a motor in accordance with our invention connected so as to control the draft of a furnace.

Figure 1a is a fragmentary view showing a rheostat, which, in accordance with the present invention, may be substituted for the thermostat of the arrangement of Figure 1.

Figure 2 is another plan view of a modified form of our invention so connected so as to operate with varying speeds in either direction.

Figure 3 is a fragmentary detail illustrating a double contact thermostat which may be used in connection with our improved motor shown in Figure 2.

Referring more in detail to the drawings, and more particularly to Fig. 1, 1 is a laminated field frame with slotted poles energized by primary coil 3 connected to an alternating current source, one pair of said poles is equipped with a set of small fixed shading coils 4 and 5 of such sufficient current capacity to cause a partial phase splitting and cause the armature 2 to rotate by the conventional shading coil method. 6 and 7 are wound shading capacity coils mounted upon the second pair of poles and of much larger capacity sufficient to overpower the effect of coils 4 and 5 and to cause reverse phase splitting and consequent motor reversal when their circuit is closed by the closing of the points 8 of the single contact thermostat 9, such thermostat being adjustable by means of screw 10 to determine the temperature of opening and closing by said points. The thermostat 9 may be connected in circuit with the wound shading coils 6 and 7 by the conductors 6a and 7a.

It will be clear from the drawing that when the points 8 of the thermostat are open, that the circuit in wound shading coils is broken thereby rendering the same inoperative and the direction of rotation of the motor will be determined by the action of the fixed shading coils 4 and 5 in the usual manner and that when points 8 are closed the relatively larger capacity of the wound shading coils 6 and 7 will become operative and will cause the motor to rotate in the opposite direction having overcome the action of coils 4 and 5 producing a reverse phase splitting.

While the invention is not limited to any particular use, in this instance it is used to operate the draft of a furnace 15 by means of the train of gears and pulley 11 through the cord 12 connected to draft door 14 and counterweight 13.

In Fig. 2 we show a similar motor except instead of having one pair of fixed shading coils and one wound pair, we have two sets of wound shading coils 16—17 and 18—19 connected to the double rheostat 20 which as shown by the drawings is so disposed that either set of shading coils may have their circuits partially or completely closed by moving contact arm 21 over either resistance members 22 or 23 and thus the motor may be operated in either direction with variable starting or running torque. The position 24 for the contact arm is the "off" position in which all of the shading coils are inoperative and consume no power. The position of the rheostat arm 21 also may be used to regulate the motor speed.

From the above description, it will be clear that we have provided, although not limited thereto, a remote control for varying the capacity of shading coils or for breaking or closing the circuit of a wound shading coil to render the same operative or inoperative in a motor of the type described.

It will be understood also that the wound shading coils are normally insulated from the poles upon which they are mounted.

In Figure 1a we show an ordinary rheostat 25 which can be substituted for the thermostat 9 of Figure 1, and in which case it is connected in circuit with the wound shading coils 6 and 7 by means of the conductors 6a and 7a. The rheostat 25 provides for varying the resistance in circuit with the wound shading coils and hence varying their shading effect, whereby the speed and direction of rotation of the motor may be controlled.

From the above description, it will be apparent that, in one aspect, our method of operation comprises controlling the speed and direction of rotation of an alternating current single phase motor by opening and closing the circuit or circuits, or varying the resistance of such circuit or circuits, of a wound shading coil or coils through the action of a thermostat, rheostat, or by other means.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What we claim is:

1. The method of controlling the rotation of a single phase alternating current motor having a primary winding and shading coils of different shading capacity, which consists in operating the motor with a shading coil of lesser shading capacity in opposition to another shading coil of larger shading capacity which effects rotation of the motor, and directly varying the resistance in circuit with at least one of said shading coils to effect control of the motor speed.

2. The method of operating a shaded pole alternating current induction motor having a primary winding and opposing shading coils of different shading capacity, which consists in operating the motor in one direction under the influence of one set of said shading coils, operating the motor in the other direction under the predominating influence of a second set of inductively opposing shading coils of larger shading capacity and against the effect of the said first named set of shading coils, and then controlling the shading effect of the said last named set of shading coils to render the first named coils effectual to cause reversal of the motor.

GEORGE W. CRISE.
WILFORD P. CRISE.